(12) United States Patent
Tsuda et al.

(10) Patent No.: US 8,453,478 B2
(45) Date of Patent: Jun. 4, 2013

(54) GLASS PLATE MANUFACTURING METHOD AND MANUFACTURING DEVICE

(75) Inventors: Masahiro Tsuda, Tokyo (JP); Takashi Mukai, Tokyo (JP); Takeshi Naraki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 14 days.

(21) Appl. No.: 13/349,798

(22) Filed: Jan. 13, 2012

(65) Prior Publication Data

US 2012/0159990 A1 Jun. 28, 2012

Related U.S. Application Data

(63) Continuation of application No. PCT/JP2010/058670, filed on May 21, 2010.

(30) Foreign Application Priority Data

Jul. 13, 2009 (JP) .................................. 2009-164345

(51) Int. Cl.
*C03B 17/00* (2006.01)

(52) U.S. Cl.
USPC .................. 65/90; 65/195; 65/53; 65/193

(58) Field of Classification Search
USPC ................ 65/53, 90, 66, 91, 95, 96, 97, 98, 65/126, 128, 137, 193, 194, 195, 199, 200, 65/201
See application file for complete search history.

(56) References Cited

U.S. PATENT DOCUMENTS

2006/0016219 A1* 1/2006 Pitbladdo .................... 65/29.21

FOREIGN PATENT DOCUMENTS

| JP | 02-149437 A | 6/1990 |
| JP | 05-046929 U | 6/1993 |
| JP | 2007-051028 A | 3/2007 |
| JP | 2008-088005 A | 4/2008 |
| JP | 2008088005 A * | 4/2008 |
| JP | 2009-519884 A | 5/2009 |
| JP | 2009-149463 A | 7/2009 |

OTHER PUBLICATIONS

JP 2008088005 (Machine Translation) [online], [retrieved on Jun. 14, 2012], retrieved from PAJ Database (http://www19.ipdl.inpit.go.jp/PA1 /cgi-bin/PA1INDEX).*

* cited by examiner

*Primary Examiner* — Richard Crispino
*Assistant Examiner* — Yana Belyaev
(74) *Attorney, Agent, or Firm* — Foley & Lardner LLP

(57) ABSTRACT

The present invention relates to a method for manufacturing a glass sheet, the method including: running down molten glass along both side surfaces of a molded body arranged inside a molding chamber; joining and integrating the molten glass just under a lower edge part of the molded body; and drawing downward an integrated sheet-shaped glass ribbon out of an opening of the molding chamber.

5 Claims, 4 Drawing Sheets

GLASS PLATE MANUFACTURING METHOD AND MANUFACTURING DEVICE

TECHNICAL FIELD

The present invention relates to a method and a device for manufacturing a glass sheet.

BACKGROUND ART

A method called a fusion process is conventionally known as a manufacturing method of a high-quality glass sheet. The fusion process is a method in which molten glass is run down along both side surfaces of a molded body with a cross section of a wedge shape converging downward and also the molten glass is joined and integrated just under a lower edge part of the molded body and while cooling an integrated sheet-shaped glass ribbon, the glass ribbon is drawn downward, thereby molding in a target thickness.

In the fusion process, it is necessary to maintain an atmosphere in the vicinity of the molded body at relatively high temperature so that the molten glass running down along both side surfaces of the molded body runs in a uniform thickness. Also, it is necessary to maintain an atmosphere of the lower portion of the molded body at relatively low temperature so that the glass ribbon separate from the lower edge part of the molded body does not contract in a width direction by surface tension.

Hence, a technique for providing partition walls just under a molded body and respectively arranging the two partition walls from both sides of a glass ribbon so as to approach the glass ribbon as close as possible in order to inhibit an atmosphere in the vicinity of the molded body from mutually influencing an atmosphere of the lower portion of the molded body is conventionally known (for example, see Patent Documents 1 and 2).

BACKGROUND ART DOCUMENTS

Patent Document

Patent Document 1: JP-A-2-149437
Patent Document 2: JP-UM-A-5-46929

SUMMARY OF THE INVENTION

Problems that the Invention is to Solve

However, when the partition walls are arranged so as to approach the glass ribbon as close as possible as described in the conventional technique, the atmosphere in the vicinity of the molded body is separated from the atmosphere of the lower portion of the molded body, and heat transfer between the lower portion of a molding chamber and the molding chamber for receiving the molded body is inhibited. As a result, a sudden change in temperature occurs at the boundary between the molding chamber and the lower portion of the molding chamber and it becomes difficult to control temperature distribution at the boundary, so that the glass ribbon is cut and it becomes difficult to produce glass sheets continuously stably. Or, even when the glass ribbon is not cut, warpage or non-uniformity of thickness of the manufactured glass sheet occurs. Therefore, it was difficult to manufacture the high-quality glass sheet in the conventional technique.

The invention has been implemented in view of the problem described above, and an object of the invention is to provide a method and a device for manufacturing a glass sheet capable of easily manufacturing a high-quality glass sheet.

Means for Solving the Problems

In order to solve the above-mentioned problem, the present invention relates to a method for manufacturing a glass sheet, the method comprising:
  running down molten glass along both side surfaces of a molded body arranged inside a molding chamber;
  joining and integrating the molten glass just under a lower edge part of the molded body; and
  drawing downward an integrated sheet-shaped glass ribbon out of an opening of the molding chamber,
  wherein a viscosity ratio ($V_2/V_1$) of a viscosity ($V_1$) of a center in a width direction of the molten glass in an upper edge of the molded body to a viscosity ($V_2$) of a center in a width direction of the glass ribbon passing through the opening of the molding chamber is set in the range of 20 to 50000,
  a thickness of the center in the width direction of the glass ribbon passing through the opening of the molding chamber is set to 1.0 mm or less,
  a gap between a vertical plane including a lower edge of the molded body and the opening of the molding chamber, in a direction orthogonal to the vertical plane, is set in the range of 8 mm to 70 mm, and
  gaps between side surface portions in a width direction side of the glass ribbon of the opening of the molding chamber and respective ends in the width direction of the glass ribbon passing through the opening of the molding chamber are set in the range of 10 mm to 500 mm.

Also, the present invention relates to a device for manufacturing a glass sheet, comprising:
  a molded body for joining and integrating molten glass run down along both side surfaces just under a lower edge part of the molded body;
  a molding chamber inside which the molded body is arranged; and
  an opening of the molding chamber for drawing downward a sheet-shaped glass ribbon integrated by the molded body out of the molding chamber,
  wherein a viscosity ratio ($V_2/V_1$) of a viscosity ($V_1$) of a center in a width direction of the molten glass in an upper edge of the molded body to a viscosity ($V_2$) of a center in a width direction of the glass ribbon passing through the opening of the molding chamber is set in the range of 20 to 50000,
  a thickness of the center in the width direction of the glass ribbon passing through the opening of the molding chamber is set to 1.0 mm or less,
  a gap between a vertical plane including a lower edge of the molded body and the opening of the molding chamber, in a direction orthogonal to the vertical plane, is set in the range of 8 mm to 70 mm, and
  gaps between side surface portions in a width direction side of the glass ribbon of the opening of the molding chamber and respective ends in the width direction of the glass ribbon passing through the opening of the molding chamber are set in the range of 10 mm to 500 mm.

Advantage of the Invention

According to the invention, a method and device for manufacturing a glass sheet capable of easily manufacturing the high-quality glass sheet can be provided.

MODE FOR CARRYING OUT THE INVENTION

A mode for carrying out the invention will hereinafter be described with reference to the drawings.

Figure 1:
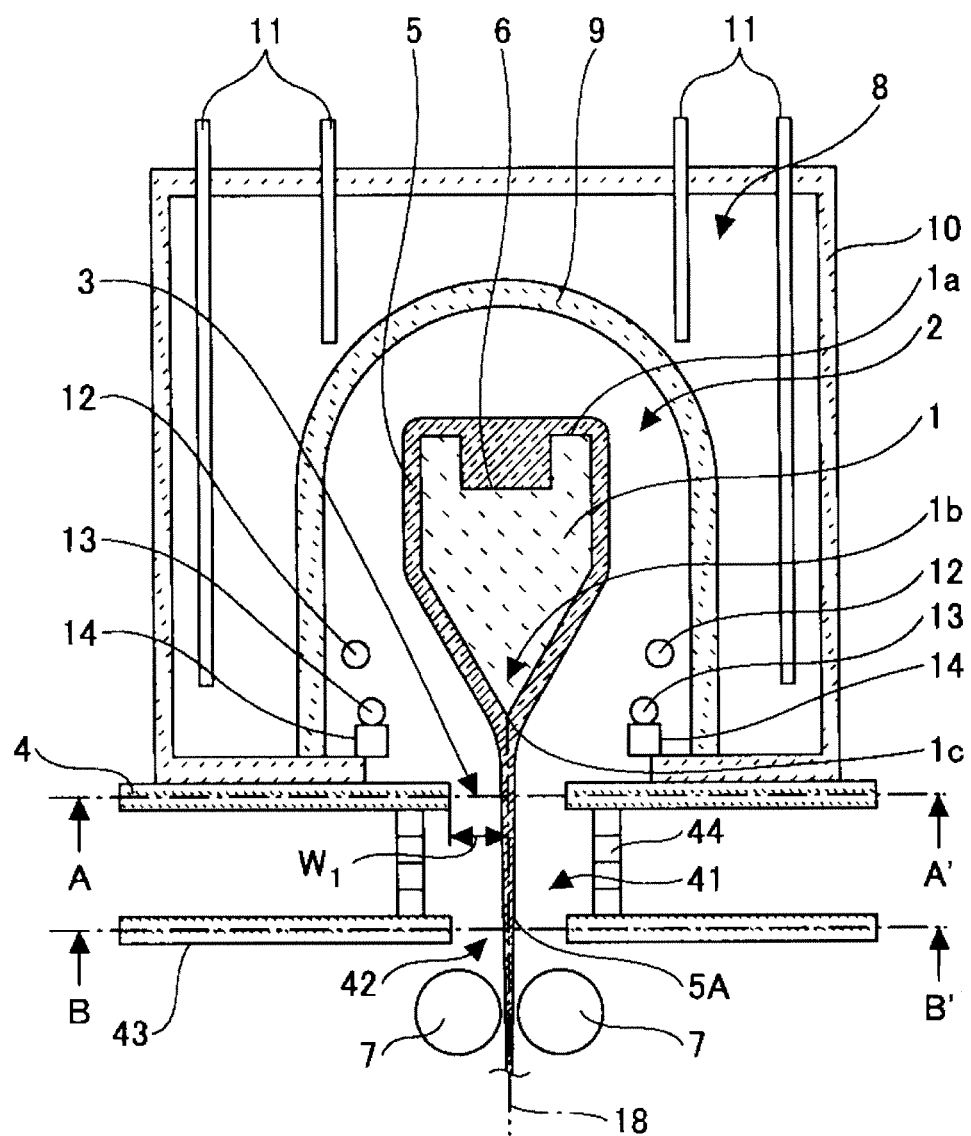
FIG. 1 is a partially sectional view showing one example of a manufacturing device of a glass sheet of the invention.
Figure 2:
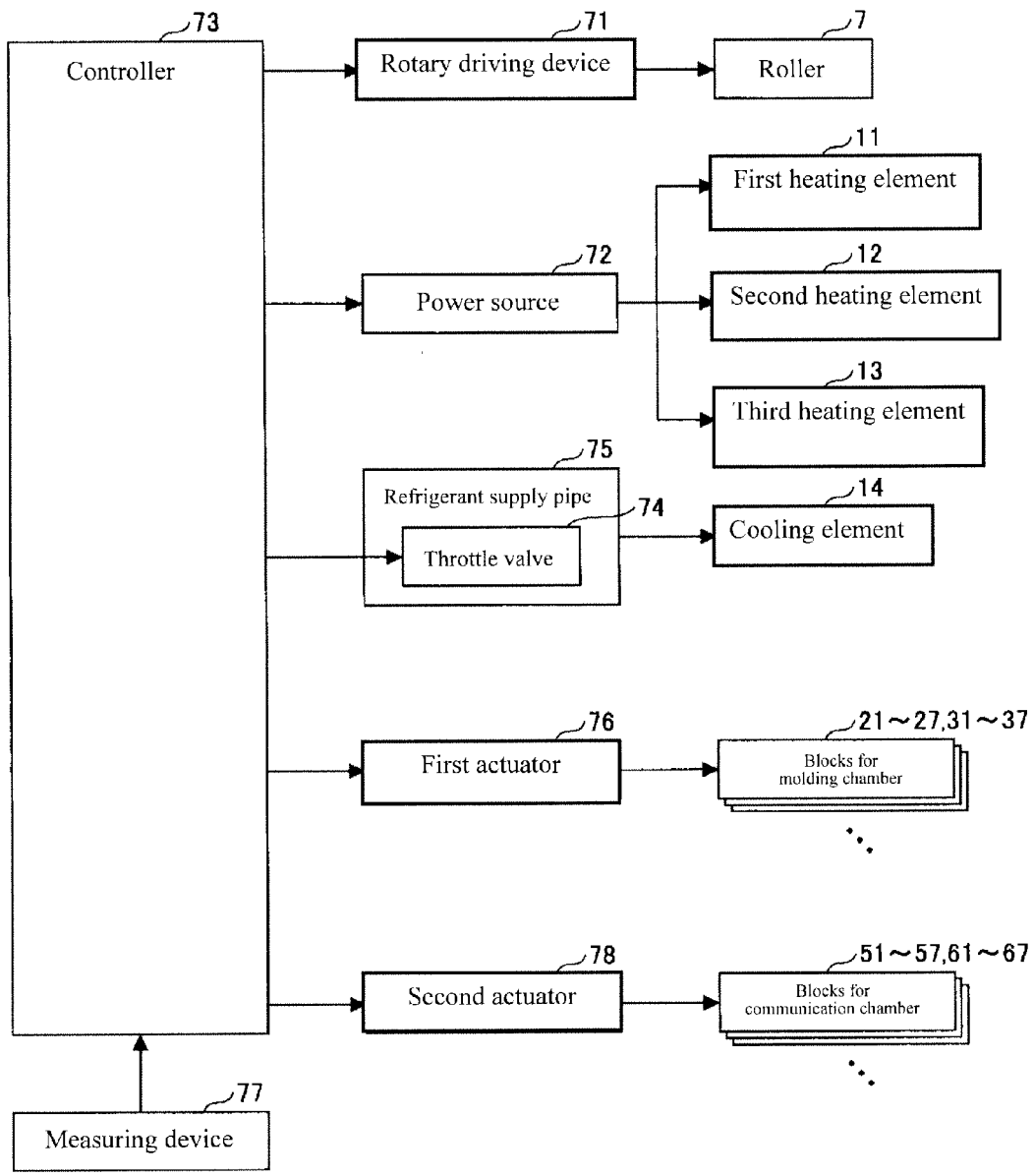
FIG. 2 is a functional block diagram showing a control system of the manufacturing device of the glass sheet of FIG. 1.

FIG. 1 is a partially sectional view showing a manufacturing device of a glass sheet according to one embodiment of the invention. FIG. 2 is a functional block diagram showing a control system of the manufacturing device of the glass sheet of FIG. 1. As shown in FIG. 1, the manufacturing device of the glass sheet has a molded body 1 for joining and integrating molten glass run down along both side surfaces just under a lower edge part of the molded body 1, a molding chamber 2 inside which the molded body 1 is arranged, and an opening 3 of the molding chamber for drawing downward a sheet-shaped glass ribbon integrated by the molded body 1 out of the molding chamber 2. The opening 3 of the molding chamber is constructed by a first opening member 4.

The molded body 1 is constructed of, for example, an alumina or zirconia refractory. The molded body 1 has a cross section of a wedge shape converging downward. A recess 6 is formed in the upper portion of the molded body 1.

A molten glass supply pipe (not shown) is connected to the recess 6 of the molded body 1. Molten glass 5 supplied from this molten glass supply pipe to the inside of the recess 6 spills from an upper edge (that is, the upper edge of the molded body 1) 1a of the recess 6 and runs down along both side surfaces of the molded body 1 and joins just under a lower edge part 1b of the molded body 1.

The joining molten glass 5 forms a sheet-shaped glass ribbon 5A. The glass ribbon 5A is molded by being downward elongated by a pair of rollers 7 rotated and driven by a rotary driving device 71. In addition, in the embodiment, a pair of rollers 7 is provided by one set, but may be provided by plural sets.

In the glass ribbon 5A after molding, both ends in a width direction of the glass ribbon 5A are cut off and the remaining center in the width direction is used as a glass sheet which is a product.

The molding chamber 2 is installed inside a furnace chamber 8. The molding chamber 2 and the furnace chamber 8 are partitioned by a partition wall 9. The partition wall 9 is placed and fixed on a floor surface of a furnace wall 10 forming the furnace chamber 8. The partition wall 9 and the furnace wall 10 are constructed of a refractory.

Plural first heating elements 11 are installed inside the furnace chamber 8 in order to prevent the molten glass 5 or the glass ribbon 5A from being cooled. Each of the first heating elements 11 is connected to a power source 72. The amount of electric power of supply from the power source 72 to each of the first heating elements 11 is individually controlled by a controller 73. Consequently, temperature of the molten glass 5 or the glass ribbon 5A can be adjusted.

Second heating elements 12, third heating elements 13 and cooling elements 14 are installed in the molding chamber 2 in order to control temperature distribution in a vertical direction and a width direction of the molten glass 5 or the glass ribbon 5A.

The second heating elements 12 are arranged in both sides of the molded body 1, and the plural heating elements 12 are disposed in a direction parallel to the width direction of the molten glass 5 in each side. Each of the second heating elements 12 is connected to the power source 72. The amount of electric power of supply from the power source 72 to each of the second heating elements 12 is individually controlled by the controller 73. Consequently, temperature distribution in the vertical direction and the width direction of the molten glass 5 or the glass ribbon 5A can be adjusted.

The third heating elements 13 are arranged in both sides in the vicinity of the lower edge part 1b of the molded body 1, and the plural heating elements 13 are disposed in the direction parallel to the width direction of the molten glass 5 in each side. Each of the third heating elements 13 is connected to the power source 72. The amount of electric power of supply from the power source 72 to each of the third heating elements 13 is individually controlled by the controller 73. Consequently, temperature distribution in the vertical direction and the width direction of the molten glass 5 or the glass ribbon 5A can be adjusted.

The cooling elements 14 are arranged in both sides in the vicinity of the lower edge part 1b of the molded body 1, and the plural cooling elements 14 are disposed in the direction parallel to the width direction of the molten glass 5 in each side. Each of the cooling elements 14 is connected to a refrigerant supply pipe 75 capable of adjusting an aperture by a throttle valve 74. The amount of refrigerant supply from the refrigerant supply pipe 75 to each of the cooling elements 14 is individually controlled by the controller 73. Consequently, temperature distribution in the vertical direction and the width direction of the molten glass 5 or the glass ribbon 5A can be adjusted.

Figure 3:
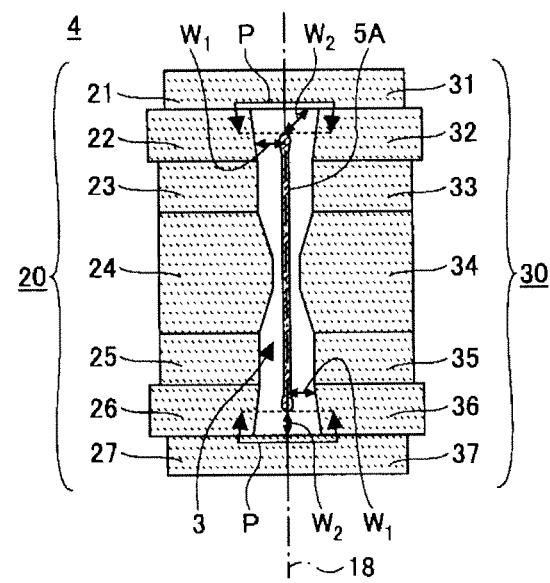
FIG. 3 is a sectional view along line A-A' of FIG. 1 and is the sectional view showing an opening 3 of the molding chamber.
Figure 4:
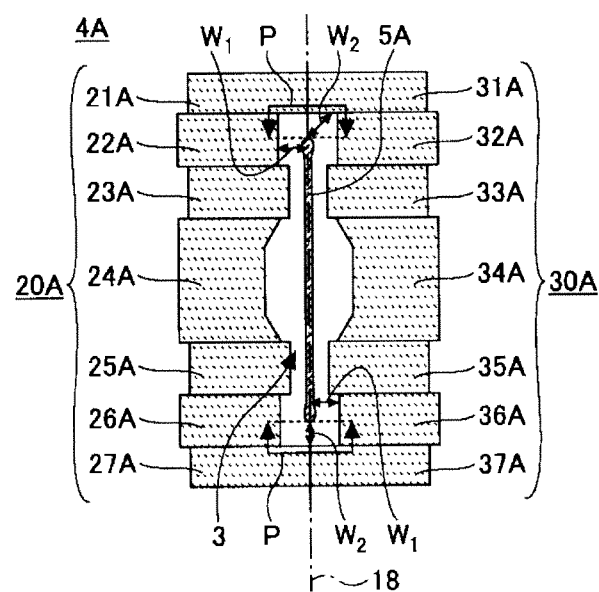
FIG. 4 is a sectional view showing a modified example of FIG. 3.

FIG. 3 is a sectional view seen from the side of the molded body 1 along line A-A' of FIG. 1, and is the sectional view showing the opening 3 of the molding chamber. FIG. 4 is a sectional view showing a modified example of FIG. 3.

The opening 3 of the molding chamber is provided just under the molded body 1. The opening 3 of the molding chamber extends in the width direction of the glass ribbon 5A. A shape dimension of the opening 3 of the molding chamber is set larger than a shape dimension of a cross section of the glass ribbon 5A so that the first opening member 4 does not make contact with the glass ribbon 5A. A thickness of the center in the width direction of the glass ribbon 5A passing through the opening 3 of the molding chamber is 1.0 mm or less.

Next, the shape dimension of the opening 3 of the molding chamber will be described.

First, a gap $W_1$ between a vertical plane 18 including a lower edge 1c of the molded body 1 and the opening 3 of the molding chamber, in a direction orthogonal to the vertical plane 18, will be described.

The gap $W_1$ is set in the range of 8 mm to 70 mm, more preferably, the range of 10 mm to 60 mm. In addition, the gap $W_1$ may be constant or vary in the width direction of the glass ribbon 5A as long as the gap $W_1$ is set within the range described above. Also, the gap $W_1$ may be constant or vary in a longitudinal direction (vertical direction in FIG. 1) of the glass ribbon 5A as long as the gap $W_1$ is set within the range described above.

When the gap $W_1$ is set smaller than 8 mm, heat transfer between the molding chamber 2 and the lower portion of the molding chamber 2 is inhibited, and a temperature of the molding chamber 2 tends to become a desired temperature or higher, and a big temperature difference occurs between the molding chamber 2 and the lower portion of the molding chamber 2 (that is, the upper portion and the lower portion of the first opening member 4 regarded as a boundary). Therefore, a sudden change in temperature occurs at the boundary (that is, the vicinity of the opening 3 of the molding chamber) between the molding chamber 2 and the lower portion of the molding chamber 2. As a result, it becomes difficult to control temperature distribution at the boundary, so that a width of the glass ribbon 5A becomes narrow under its own weight or by a downward tensile force and the glass ribbon 5A is cut and it becomes difficult to produce the glass sheets continuously stably. Or, even when the glass ribbon 5A is not cut, warpage or non-uniformity of thickness of the manufactured glass sheet may occur.

On the other hand, when the gap $W_1$ is set larger than 70 mm, the heat transfer between the molding chamber 2 and the lower portion of the molding chamber 2 is promoted, and the temperature of the molding chamber 2 tends to become a desired temperature or lower. As a result, a viscosity of the glass ribbon 5A becomes high and the glass ribbon 5A is not elongated thinly and may be cut.

When the gap $W_1$ is set smaller than 8 mm or is set larger than 70 mm thus, a problem arises. The problem is seen in the case of manufacturing a thin glass sheet with a thickness of 1.0 mm or less, and is particularly remarkably seen in the case of manufacturing the thin glass sheet with a thickness of 0.3 mm or less.

When the gap $W_1$ is set in the range of 8 mm to 70 mm, a viscosity ratio $V_2/V_1$ of a viscosity $V_1$ of the center in the width direction of the molten glass 5 in the upper edge 1a of the molded body 1 to a viscosity $V_2$ of the center in the width direction of the glass ribbon 5A passing through the opening 3 of the molding chamber is set in the range of 20 to 50000.

When the viscosity ratio $V_2/V_1$ is set smaller than 20, a width of the glass ribbon 5A becomes narrow under its own weight or by a downward tensile force and the glass ribbon 5A may be cut, or a thickness of the glass ribbon 5A may become non-uniform even when the glass ribbon is not cut. When the viscosity ratio $V_2/V_1$ is set larger than 50000, the glass ribbon 5A is not elongated well thinly and may be cut.

Next, gaps $W_2$ (see FIGS. 3 and 4) between side surface portions P (see FIGS. 3 and 4) in the width direction side of the glass ribbon 5A of the opening 3 of the molding chamber and respective ends in the width direction of the glass ribbon 5A passing through the opening 3 of the molding chamber will be described.

The gap $W_2$ is set in the range of 10 mm to 500 mm.

When the gap $W_2$ is set smaller than 10 mm, heat transfer between the molding chamber 2 and the lower portion of the molding chamber 2 is inhibited, and a temperature in the vicinity of the end of the glass ribbon 5A of the molding chamber 2 tends to become a desired temperature or higher. Also, when the gap $W_2$ is set larger than 500 mm, the heat transfer between the molding chamber 2 and the lower portion of the molding chamber 2 is promoted, and the temperature in the vicinity of the end of the glass ribbon 5A of the molding chamber 2 tends to become a desired temperature or lower. Therefore, in both cases, a temperature difference between the center and the end in the width direction of the glass ribbon 5A becomes big. As a result, a thickness of the glass ribbon 5A becomes too thin or the glass ribbon 5A warps too much and thereby, the glass ribbon 5A is cut and it becomes difficult to produce the glass sheets continuously stably. Or, even when the glass ribbon 5A is not cut, warpage or non-uniformity of thickness of the manufactured glass sheet may occur.

Next, the first opening member 4 in which the opening 3 of the molding chamber is formed will be described with reference to FIGS. 1 and 3.

The first opening member 4 is desirably formed of a material in which heat transfer resistance in operating temperature is 0.001 m²K/W or more. A plate made of, for example, ceramic fiber is used in the first opening member 4. Consequently, heat transfer through the first opening member 4 can be inhibited and temperature distribution of the inside of the molding chamber 2 can be controlled easily.

The first opening member 4 may have, for example, a plate shape as shown in FIG. 1 or a block shape, and the shape of the first opening member 4 is not limited. In an example shown in FIGS. 1 and 3, the first opening member 4 is substantially horizontally provided just under the furnace wall 10, and is broadly constructed of two partition wall members 20, 30. The two partition wall members 20, 30 are arranged so as to sandwich the vertical plane 18. A gap formed by the two partition wall members 20, 30 forms the opening 3 of the molding chamber for passing the glass ribbon 5A under the molding chamber 2.

The partition wall member 20 is preferably divided into plural blocks 21 to 27 for molding chamber in the width direction of the glass ribbon 5A. In other words, the partition wall member 20 is preferably constructed of the plural blocks 21 to 27 for molding chamber aligned in a direction parallel to the width direction of the glass ribbon 5A.

The partition wall member 30 is preferably divided into plural blocks 31 to 37 for molding chamber in the width direction of the glass ribbon 5A. In other words, the partition wall member 30 is preferably constructed of the plural blocks 31 to 37 for molding chamber aligned in the direction parallel to the width direction of the glass ribbon 5A. In addition, the number of divisions of one partition wall member 20 may be equal to or different from the number of divisions of the other partition wall member 30.

A division surface of each of the blocks 21 to 27, 31 to 37 for molding chamber is set perpendicularly to the width direction of the glass ribbon 5A. In addition, in the embodiment, the division surface of each of the blocks 21 to 27, 31 to 37 for molding chamber is set perpendicularly to the width direction of the glass ribbon 5A, but may be set obliquely to the width direction of the glass ribbon 5A.

A shape of a surface opposed to the vertical plane 18 of each of the blocks 21 to 27, 31 to 37 for molding chamber may be parallel or nonparallel to the vertical plane 18.

Each of the blocks 21 to 27, 31 to 37 for molding chamber has a configuration movable in a direction of moving near to or away from the vertical plane 18 manually or by a first actuator 76.

Also, each of the blocks 21 to 27, 31 to 37 for molding chamber has a configuration replaceable manually or by the first actuator 76 without stopping of supply of the molten glass 5 to the molded body 1. If supply of the molten glass 5 to the molded body 1 is stopped in the case of replacement, manufacture of the glass sheet is stopped for a long time.

Next, adjustment or change of a shape dimension of the opening 3 of the molding chamber will be described.

In the embodiment, the shape dimension of the opening 3 of the molding chamber can be adjusted by moving one or plural blocks 22 to 26 for molding chamber in the middle of the partition wall member 20 in a direction of moving near to or away from the vertical plane 18. The shape dimension of the opening 3 of the molding chamber can be adjusted by moving one or plural blocks 32 to 36 for molding chamber in the middle of the partition wall member 30 in the direction of moving near to or away from the vertical plane 18. Also, the shape dimension of the opening 3 of the molding chamber can be changed by replacing one or plural blocks 22 to 26, 32 to 36 for molding chamber.

In addition, when the blocks 22 to 26, 32 to 36 for molding chamber in the middle are replaced, for example, one block 22 to 26, 32 to 36 for molding chamber may be respectively replaced with one block 22A to 26A, 32A to 36A for molding chamber as shown in FIGS. 3 and 4, or plural adjacent blocks for molding chamber may be replaced with one block for molding chamber.

By adjusting or changing the shape dimension of the opening 3 of the molding chamber in this manner, the gap $W_1$ between the opening 3 of the molding chamber and the vertical plane 18 can be adjusted or changed, and heat transfer between the molding chamber 2 and the lower portion of the molding chamber 2 can be adjusted. Consequently, temperature distribution (and thus a shape dimension) of the glass ribbon 5A can be adjusted, and changes in thickness, composition, etc. of the glass sheet which is a product can be handled.

In addition, in the embodiment, each of the blocks 22 to 26 for molding chamber in the middle of the partition wall member 20 may be further divided in a vertical direction in FIG. 1. Each of the blocks 32 to 36 for molding chamber in the middle of the partition wall member 30 may be further divided in the vertical direction in FIG. 1. Consequently, the heat transfer between the molding chamber 2 and the lower portion of the molding chamber 2 can be adjusted more finely.

In a fusion process, shape and material of the molded body 1, shape and material of the partition wall 9 or the furnace wall 10, and shape and arrangement of each of the heating elements, etc. are optimized so as to optimize viscosity distribution (and thus a shape dimension) of the molten glass 5 or the glass ribbon 5A. However, for example, when the molded body 1 deteriorates partially due to the molten glass 5, wettability between the molded body 1 and the molten glass 5 changes partially, so that a thickness of the molten glass 5 running down along both side surfaces of the molded body 1 changes partially. Also, when the partition wall 9, the furnace wall 10, the heating elements 11, etc. deteriorate partially, temperature distribution of the inside of the molding chamber 2 changes partially, so that viscosity distribution of the molten glass 5 or the glass ribbon 5A changes partially and a shape dimension of the molten glass 5 or the glass ribbon 5A changes partially. In the fusion process thus, the shape dimension of the molten glass 5 or the glass ribbon 5A may change due to secular deterioration in components constructing the manufacturing device of the glass sheet. This tendency is seen in the case of manufacturing a thin glass sheet with a thickness of 1.0 mm or less, and is particularly remarkably seen in the case of manufacturing the thin glass sheet with a thickness of 0.3 mm or less.

In the embodiment, by moving or replacing one or plural blocks 22 to 26, 32 to 36 for molding chamber as described above, the viscosity distribution of the molten glass 5 or the glass ribbon 5A can be controlled, so that the shape dimension of the molten glass 5 or the glass ribbon 5A can be modified. Consequently, the secular deterioration in the components constructing the manufacturing device of the glass sheet can be handled.

The shape dimension of the opening 3 of the molding chamber is adjusted or changed based on, for example, a shape dimension of the glass sheet manufactured already so that the glass sheet manufactured from now is formed in a desired shape dimension. The glass sheet manufactured already is measured by a measuring device 77 (see FIG. 2).

The measuring device 77 may be connected to the controller 73 as shown in FIG. 2. In this case, when the controller 73 receives a measured result from the measuring device 77, the controller 73 controls the first actuator 76 so that the glass sheet to be manufactured is formed in the desired shape dimension, and moves or replaces one or plural blocks 22 to 26, 32 to 36 for molding chamber. Consequently, the shape dimension of the opening 3 of the molding chamber is adjusted or changed.

For example, when a thickness of the center in the width direction of the manufactured glass sheet is thinner than a target value, a pair of blocks 24, 34 (see FIG. 3) for molding chamber in the center of the partition wall members 20, 30 is respectively moved in a direction of moving away from the vertical plane 18. Consequently, the gap $W_1$ between a side surface of the opening 3 of the molding chamber and the center in the width direction of the glass ribbon 5A becomes large, so that the amount of heat transfer between the molding chamber 2 and the lower portion of the molding chamber 2 becomes large. Therefore, in the center in the width direction of the glass ribbon 5A passing through the opening 3 of the molding chamber, the temperature becomes low and the viscosity becomes high, so that the thickness becomes thick. Hence, the thickness of the center in the width direction of the manufactured glass sheet can be set at the target value.

Also, instead of respectively moving a pair of blocks 24, 34 for molding chamber in the center of the partition wall members 20, 30 in the direction of moving away from the vertical plane 18, the blocks 24, 34 for molding chamber may be replaced with a pair of blocks 24A, 34A (see FIG. 4) for molding chamber with different shapes. Consequently, since the gap $W_1$ between the side surface of the opening 3 of the molding chamber and the center in the width direction of the glass ribbon 5A becomes large, the thickness of the center in the width direction of the manufactured glass sheet can also be set at the target value in this case.

Also, when the manufactured glass sheet has warpage, heat transfer between the molding chamber 2 and the lower portion of the molding chamber 2 is adjusted in a desired state, for example, by changing the first opening member 4 shown in FIG. 3 to a first opening member 4A shown in FIG. 4. Consequently, warpage of the manufactured glass sheet may be inhibited.

In addition, in the embodiment, the shape dimension of the opening 3 of the molding chamber is adjusted or changed based on the shape dimension of the manufactured glass sheet, but the invention is not limited to this. For example, temperature distribution of the inside of the molding chamber 2 or temperature distribution of the inside of the opening 3 of the molding chamber may be used instead of the shape dimension of the manufactured glass sheet. The temperature distribution of the inside of the molding chamber 2 or the temperature distribution of the inside of the opening 3 of the molding chamber is measured by a temperature sensor (not shown) such as a thermocouple provided inside the molding chamber 2 or the opening 3 of the molding chamber.

Here, the shape dimension of the opening 3 of the molding chamber is preferably adjusted or changed so that at least a part of the gap $W_1$ changes in the width direction of the glass ribbon 5A as shown in, for example, FIG. 3. In this case, heat transfer between the molding chamber 2 and the lower portion of the molding chamber 2 changes in the width direction of the glass ribbon 5A, so that viscosity distribution in the width direction of the glass ribbon 5A changes. Therefore, a shape dimension in the width direction of the glass ribbon 5A can be optimized. Consequently, secular deterioration in components constructing the manufacturing device of the glass sheet can be handled.

The opening 3 of the molding chamber may have a configuration substantially closable by plural blocks for molding chamber when the manufacturing device of the glass sheet is started up (that is, when the molten glass 5 is not run down along both side surfaces of the molded body 1 and the molded body 1 is heated). When the opening 3 of the molding chamber is substantially closed, heat transfer between the molding chamber 2 and the lower portion of the molding chamber 2 is prevented, so that when the molded body 1 is heated, temperature distribution in the vertical direction of the molded body 1 tends to become uniform, and damage to the molded body 1 from thermal stress can be inhibited.

In addition, when the molten glass 5 is run down along both side surfaces of the molded body 1 (when the molten glass 5 is supplied to the molded body 1), in order to pass the glass ribbon 5A under the molding chamber 2, the blocks 22 to 26, 32 to 36 for molding chamber in the middle of the respective partition wall members 20, 30 are moved to open the opening 3 of the molding chamber.

The manufacturing device of the glass sheet further comprises a communication chamber 41 for communicating with the molding chamber 2 through the opening 3 of the molding chamber, and a communication chamber opening 42 for drawing downward the glass ribbon 5A out of the communication chamber 41. The communication chamber opening 42 is formed by a second opening member 43.

The communication chamber 41 is provided under the molding chamber 2 and is surrounded by a tube wall 44. The tube wall 44 is constructed of a refractory or a heat insulating material. A heating element or a cooling element (not shown) may be installed in the tube wall 44.

The heating element is connected to the power source 72, and the amount of electric power of supply from the power source 72 to the heating element is controlled by the controller 73. The cooling element 14 is connected to the refrigerant supply pipe 75 capable of adjusting an aperture by a throttle valve, and the amount of refrigerant supply from the refrigerant supply pipe 75 to the cooling element 14 is controlled by the controller 73. Consequently, a temperature of the glass ribbon 5A passing through the communication chamber 41 can be adjusted. Thus, a temperature of the glass ribbon 5A passing through the molding chamber 2 can be adjusted by heat transfer between the molding chamber 2 and the communication chamber 41.

Figure 5:
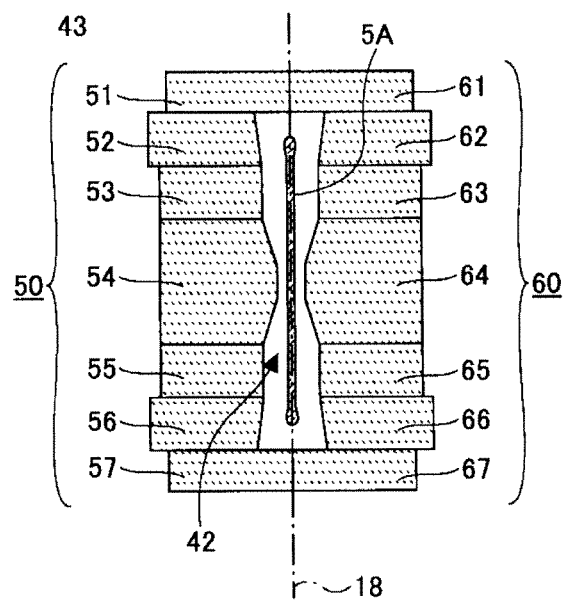
FIG. 5 is a sectional view along line B-B' of FIG. 1 and is the sectional view showing a communication chamber opening 42.

FIG. 5 is a sectional view seen from the side of the communication chamber along line B-B' of FIG. 1, and is the sectional view showing the communication chamber opening 42. A shape dimension of the communication chamber opening 42 is set larger than a cross-sectional shape of the glass ribbon 5A so that the second opening member 43 does not make contact with the glass ribbon 5A.

A gap, in a direction orthogonal to the vertical plane 18, between the vertical plane 18 including the lower edge 1c of the molded body 1 and the communication chamber opening 42 may be constant or vary in the width direction of the glass ribbon 5A. Also, the gap may be constant or vary in the longitudinal direction (vertical direction in FIG. 1) of the glass ribbon 5A. The communication chamber opening 42 is formed in the second opening member 43.

The second opening member 43 is desirably formed of a material in which heat transfer resistance in operating temperature is 0.001 $m^2K/W$ or more. A plate made of, for example, ceramic fiber is used in the second opening member 43. Consequently, heat transfer through the second opening member 43 can be inhibited and temperature distribution of the inside of the communication chamber 41 can be controlled easily.

The second opening member 43 may have, for example, a plate shape as shown in FIG. 1 or a block shape, and the shape of the second opening member 43 is not limited. In an example shown in FIGS. 1 and 5, the second opening member 43 is substantially horizontally provided just under the tube wall 44, and is broadly constructed of two partition wall members 50, 60. The two partition wall members 50, 60 are arranged so as to sandwich the vertical plane 18. A gap formed by the two partition wall members 50, 60 forms the communication chamber opening 42 for passing the glass ribbon 5A under the communication chamber 41. In addition, a configuration of the second opening member 43 may be equal to or different from a configuration of the first opening member 4 in which the opening 3 of the molding chamber is formed.

The partition wall member 50 is preferably divided into plural blocks 51 to 57 for communication chamber in the width direction of the glass ribbon 5A. In other words, the partition wall member 50 is preferably constructed of the plural blocks 51 to 57 for communication chamber aligned in a direction parallel to the width direction of the glass ribbon 5A.

The partition wall member 60 is preferably respectively divided into plural blocks 61 to 67 for communication chamber in the width direction of the glass ribbon 5A. In other words, the partition wall member 60 is preferably respectively constructed of the plural blocks 61 to 67 for communication chamber aligned in the direction parallel to the width direction of the glass ribbon 5A. In addition, the number of divisions of one partition wall member 50 may be equal to or different from the number of divisions of the other partition wall member 60.

A division surface of each of the blocks 51 to 57, 61 to 67 for communication chamber is set perpendicularly to the width direction of the glass ribbon 5A. In addition, in the embodiment, the division surface of each of the blocks 51 to 57, 61 to 67 for communication chamber is set perpendicularly to the width direction of the glass ribbon 5A, but may be set obliquely to the width direction of the glass ribbon 5A.

A shape of a surface opposed to the vertical plane 18 of each of the blocks 51 to 57, 61 to 67 for communication chamber may be parallel or nonparallel to the vertical plane 18.

Each of the blocks 51 to 57, 61 to 67 for communication chamber has a configuration movable in a direction of moving near to or away from the vertical plane 18 manually or by a second actuator 78.

Also, each of the blocks 51 to 57, 61 to 67 for communication chamber has a configuration replaceable manually or by the second actuator 78 without stopping of supply of the molten glass 5 to the molded body 1. If supply of the molten glass 5 to the molded body 1 is stopped in the case of replacement, manufacture of the glass sheet is stopped for a long time.

In the embodiment, a shape dimension of the communication chamber opening 42 can be adjusted by moving one or plural blocks 52 to 56 for communication chamber in the middle of the partition wall member 50 in a direction of moving near to or away from the vertical plane 18. The shape dimension of the communication chamber opening 42 can be adjusted by moving one or plural blocks 62 to 66 for communication chamber in the middle of the partition wall member 60 in the direction of moving near to or away from the vertical plane 18. Also, the shape dimension of the communication chamber opening 42 can be changed by replacing one or plural blocks 52 to 56, 62 to 66 for communication chamber.

By adjusting or changing the shape dimension of the communication chamber opening 42 in this manner, the gap, in the direction orthogonal to the vertical plane 18, between the communication chamber opening 42 and the vertical plane 18 can be adjusted or changed, and heat transfer between the molding chamber 2 and the communication chamber 41 and heat transfer between the communication chamber 41 and the lower portion of the communication chamber 41 can be adjusted. Consequently, temperature distribution (and thus a shape dimension) of the glass ribbon 5A can be adjusted, and even when thickness, composition, etc. of the glass sheet which is a product are changed or even when a component constructing the manufacturing device of the glass sheet deteriorates, a high-quality thin glass sheet can easily be manufactured without stopping manufacture of the glass sheet for a long time.

In addition, a chamber having the same action and function as those of the communication chamber 41 may be further provided under the communication chamber 41.

According to the embodiment as described above, the gap $W_1$ is set in the range of 8 mm to 70 mm, so that a sudden change in temperature can be prevented from occurring at the boundary between the molding chamber 2 and the lower portion of the molding chamber 2 and also, heat transfer between the molding chamber 2 and the lower portion of the molding chamber 2 can be controlled within a proper range. Consequently, a high-quality thin glass sheet can easily be manufactured.

Also, according to the embodiment, the gap $W_2$ is set in the range of 10 mm to 500 mm, so that the heat transfer between the molding chamber 2 and the lower portion of the molding chamber 2 can be controlled within a proper range. Consequently, a difference in temperature in the width direction of the glass ribbon 5A can be controlled within a proper range.

Also, according to the embodiment, the shape dimension of the opening 3 of the molding chamber is preferably adjusted or changed by moving or replacing one or plural blocks 22 to 26, 32 to 36 for molding chamber, and the heat transfer between the molding chamber 2 and the lower portion of the molding chamber 2 can be adjusted. Consequently, changes in thickness, composition, etc. of the glass sheet which is a product can be handled. Also, secular deterioration in components constructing the manufacturing device of the glass sheet can be handled.

Also, according to the embodiment, the shape dimension of the opening 3 of the molding chamber is preferably adjusted or changed so that at least a part of the gap $W_1$ changes in the width direction of the glass ribbon 5A, and the heat transfer between the molding chamber 2 and the lower portion of the molding chamber 2 can be changed in the width direction of the glass ribbon 5A. Consequently, viscosity distribution in the width direction of the glass ribbon 5A can be changed, and the shape dimension in the width direction of the glass ribbon 5A can be optimized.

Also, according to the embodiment, the shape dimension of the opening 3 of the molding chamber is preferably adjusted or changed based on the shape dimension etc. of the manufactured glass sheet, and a glass sheet with a desired shape dimension can be manufactured.

Also, according to the embodiment, it is preferable to substantially close the opening 3 of the molding chamber by the plural blocks for molding chamber when the manufacturing device of the glass sheet is started up (when the molten glass 5 is not run down along both side surfaces of the molded body 1 and the molded body 1 is heated), and the heat transfer between the molding chamber 2 and the lower portion of the molding chamber 2 is prevented. Therefore, even when the molded body 1 is heated, temperature distribution in the vertical direction of the molded body 1 tends to become uniform, and damage to the molded body 1 from thermal stress can be inhibited.

EXAMPLES

The invention will hereinafter be described in further detail by examples. In addition, the invention is not limited to the following examples, and various modifications and replacements can be made in the following examples without departing from the scope of the invention.

Example 1

In Example 1, a non-alkali glass sheet with a thickness of 0.3 mm was manufactured using the manufacturing device of the glass sheet shown in FIGS. 1 and 3. A heat insulating plate (manufactured by Nichias Corporation, T/#5461 RF board 16MD) made of ceramic fiber with a thickness of 25 mm was used as the first opening member 4. In this heat insulating plate, thermal conductivity in operating temperature was 0.2 W/m·K and heat transfer resistance in operating temperature was 0.13 $m^2K/W$.

In the gap $W_1$, the minimum value was set at 25 mm and the maximum value was set at 55 mm. In the gap $W_2$, the minimum value was set at 45 mm and the maximum value was set at 125 mm.

A temperature of the center in the width direction of the molten glass 5 in the upper edge 1a of the molded body 1 made of zirconia was measured and was converted into a viscosity $V_1$. Also, a temperature of the center in the width direction of the glass ribbon 5A in the opening 3 of the molding chamber was measured and was converted into a viscosity $V_2$. A viscosity ratio $V_2/V_1$ was 10000.

A thickness of the center in the width direction of the glass ribbon 5A after molding was measured.

Table 1 shows the results. The average of thicknesses was 0.3 mm of a target, and a high-quality thin non-alkali glass sheet in which the maximum deviation of thickness was ±0.01 mm was obtained.

Example 2

In Example 2, a non-alkali glass sheet with a thickness of 0.2 mm was manufactured using the manufacturing device of the glass sheet shown in FIGS. 1 and 3. A heat insulating plate (manufactured by Nichias Corporation, T/#5461 RF board 16MD) made of ceramic fiber with a thickness of 25 mm was used as the first opening member 4. In this heat insulating plate, thermal conductivity in operating temperature was 0.2 W/m·K and heat transfer resistance in operating temperature was 0.13 $m^2K/W$.

In the gap $W_1$, the minimum value was set at 20 mm and the maximum value was set at 52 mm. In the gap $W_2$, the minimum value was set at 44 mm and the maximum value was set at 125 mm.

A temperature of the center in the width direction of the molten glass 5 in the upper edge 1a of the molded body 1 made of zirconia was measured and was converted into a viscosity $V_1$. Also, a temperature of the center in the width direction of the glass ribbon 5A in the opening 3 of the molding chamber was measured and was converted into a viscosity $V_2$. A viscosity ratio $V_2/V_1$ was 900.

A thickness of the center in the width direction of the glass ribbon 5A after molding was measured.

Table 1 shows the results. The average of thicknesses was 0.2 mm of a target, and a high-quality thin non-alkali glass sheet in which the maximum deviation of thickness was ±0.01 mm was obtained.

Example 3

In Example 3, a non-alkali glass sheet with a thickness of 0.1 mm was manufactured using the manufacturing device of the glass sheet shown in FIGS. 1 and 3. A heat insulating plate (manufactured by Nichias Corporation, T/#5461 RF board 16MD) made of ceramic fiber with a thickness of 25 mm was used as the first opening member 4. In this heat insulating plate, thermal conductivity in operating temperature was 0.2 W/m·K and heat transfer resistance in operating temperature was 0.13 m²K/W.

In the gap $W_1$, the minimum value was set at 11 mm and the maximum value was set at 50 mm. In the gap $W_2$, the minimum value was set at 43 mm and the maximum value was set at 125 mm.

A temperature of the center in the width direction of the molten glass 5 in the upper edge 1a of the molded body 1 made of zirconia was measured and was converted into a viscosity $V_1$. Also, a temperature of the center in the width direction of the glass ribbon 5A in the opening 3 of the molding chamber was measured and was converted into a viscosity $V_2$. A viscosity ratio $V_2/V_1$ was 30.

A thickness of the center in the width direction of the glass ribbon 5A after molding was measured.

Table 1 shows the results. The average of thicknesses was 0.1 mm of a target, and a high-quality thin non-alkali glass sheet in which the maximum deviation of thickness was ±0.01 mm was obtained.

Comparative Example 1

Figure 6:
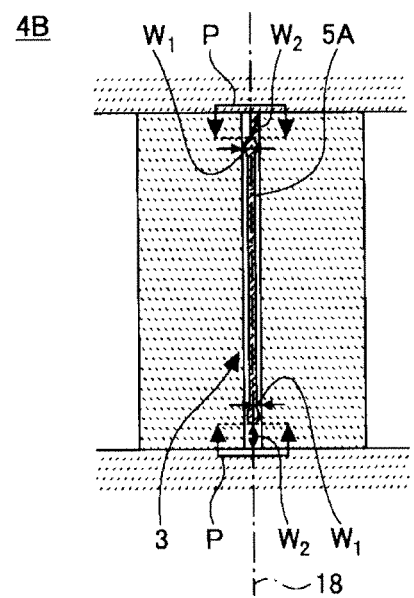
FIG. 6 is a sectional view showing a comparative example corresponding to FIG. 3.

In Comparative Example 1, experiment was performed in a manner similar to Example 1 except that setting of the gap $W_1$ was changed using a first opening member 4B shown in FIG. 6 instead of the first opening member 4 shown in FIG. 3 (see Table 1). A viscosity ratio $V_2/V_1$ was 15.

Table 1 shows the results. In Comparative Example 1, the gap $W_1$ was too small, so that heat transfer between the molding chamber 2 and the lower portion of the molding chamber 2 was inhibited. As a result, a viscosity of the glass ribbon 5A became low and a width of the glass ribbon 5A became narrow and the glass ribbon 5A was cut halfway and stable continuous molding could not be implemented.

Comparative Example 2

In Comparative Example 2, experiment was performed in a manner similar to Example 1 except that setting of the gap $W_1$ was changed using the first opening member 4B shown in FIG. 6 instead of the first opening member 4 shown in FIG. 3 (see Table 1). A viscosity ratio $V_2/V_1$ was 80000.

Table 1 shows the results. In Comparative Example 2, the gap $W_1$ was too large, so that heat transfer between the molding chamber 2 and the lower portion of the molding chamber 2 was promoted. As a result, a viscosity of the glass ribbon 5A became high and the glass ribbon 5A could not be elongated thinly well and was cut halfway and stable continuous molding could not be implemented.

Comparative Example 3

In Comparative Example 3, experiment was performed in a manner similar to Example 1 except that setting of the gap $W_1$ and the gap $W_2$ was changed using the first opening member 4B shown in FIG. 6 instead of the first opening member 4 shown in FIG. 3 (see Table 1). A viscosity ratio $V_2/V_1$ was 30000.

Table 1 shows the results. In Comparative Example 3, the minimum value of the gap $W_2$ was too small, so that heat transfer between the molding chamber 2 and the lower portion of the molding chamber 2 was inhibited. As a result, a temperature of the end in the width direction of the glass ribbon 5A became high and a temperature difference between the center and the end in the width direction of the glass ribbon 5A became big and the glass ribbon 5A could not be elongated equally in the width direction and stable continuous molding could not be implemented.

Comparative Example 4

In Comparative Example 4, experiment was performed in a manner similar to Example 1 except that setting of the gap $W_1$ and the gap $W_2$ was changed using the first opening member 4B shown in FIG. 6 instead of the first opening member 4 shown in FIG. 3 (see Table 1). A viscosity ratio $V_2/V_1$ was 40000.

Table 1 shows the results. In Comparative Example 4, the maximum value of the gap $W_2$ was too large, so that heat transfer between the molding chamber 2 and the lower portion of the molding chamber 2 was promoted. As a result, a temperature of the end in the width direction of the glass ribbon 5A became low and a temperature difference between the center and the end in the width direction of the glass ribbon 5A became big and the glass ribbon 5A could not be elongated equally in the width direction and stable continuous molding could not be implemented.

TABLE 1

|  | Gap $W_1$ (mm) | | Gap $W_2$ (mm) | | | | Sheet Thickness (mm) | |
|---|---|---|---|---|---|---|---|---|
|  | Maximum Value | Minimum Value | Maximum Value | Minimum Value | Viscosity Ratio of Glass = $V_2/V_1$ | Possible or Impossible of Molding | Average | Sheet Thickness Deviation |
| Example 1 | 55 | 25 | 125 | 45 | 10000 | Possible to Mold | 0.3 | ±0.01 |
| Example 2 | 52 | 20 | 125 | 44 | 900 | Possible to Mold | 0.2 | ±0.01 |
| Example 3 | 50 | 11 | 125 | 43 | 30 | Possible to Mold | 0.1 | ±0.01 |
| Comparative Example 1 | 5 (Constant) | | 125 | 45 | 15 | Impossible to Continuous Stable Mold | | |
| Comparative Example 2 | 75 (Constant) | | 125 | 45 | 80000 | Impossible to Continuous Stable Mold | | |
| Comparative Example 3 | 50 (Constant) | | 125 | 8 | 30000 | Impossible to Continuous Stable Mold | | |
| Comparative Example 4 | 50 (Constant) | | 510 | 50 | 40000 | Impossible to Continuous Stable Mold | | |

The invention has been described in detail with reference to the specific embodiment, but it is apparent to those skilled in the art that various changes or modifications can be made without departing from the spirit and scope of the invention.

The present application is based on Japanese patent application No. 2009-164345 filed on Jul. 13, 2009, and the contents of the patent application are hereby incorporated by reference.

INDUSTRIAL APPLICABILITY

According to the invention, a method and a device for manufacturing a glass sheet capable of easily manufacturing a high-quality glass sheet can be provided.

DESCRIPTION OF REFERENCE NUMERALS AND SIGNS

| | |
|---|---|
| 1 | MOLDED BODY |
| 1a | UPPER EDGE |
| 1b | LOWER EDGE PART |
| 1c | LOWER EDGE |
| 2 | MOLDING CHAMBER |
| 3 | OPENING OF MOLDING CHAMBER |
| 4 | FIRST OPENING MEMBER |
| 5 | MOLTEN GLASS |
| 5A | GLASS RIBBON |
| 18 | VERTICAL PLANE |
| 20 | PARTITION WALL MEMBER |
| 21~27 | BLOCK FOR MOLDING CHAMBER |
| 30 | PARTITION WALL MEMBER |
| 31~37 | BLOCK FOR MOLDING CHAMBER |
| 41 | COMMUNICATION CHAMBER |
| 42 | COMMUNICATION CHAMBER OPENING |
| 43 | SECOND OPENING MEMBER |
| 50 | PARTITION WALL MEMBER |
| 51~57 | BLOCK FOR COMMUNICATION CHAMBER |
| 60 | PARTITION WALL MEMBER |
| 61~67 | BLOCK FOR COMMUNICATION CHAMBER |

The invention claimed is:

1. A method for manufacturing a glass sheet, the method comprising:

running down molten glass along both side surfaces of a molded body arranged inside a molding chamber;

joining and integrating the molten glass just under a lower edge part of the molded body; and drawing downward an integrated sheet-shaped glass ribbon out of an opening of the molding chamber, wherein a viscosity ratio ($V_2/V_1$) of a viscosity ($V_1$) of a center in a width direction of the molten glass in an upper edge of the molded body to a viscosity ($V_2$) of a center in a width direction of the glass ribbon passing through the opening of the molding chamber is set in the range of 20 to 50000, a thickness of the center in the width direction of the glass ribbon passing through the opening of the molding chamber is set to 1.0 mm or less, a gap between a vertical plane including a lower edge of the molded body and the opening of the molding chamber, in a direction orthogonal to the vertical plane, is set in the range of 8 mm to 70 mm, and gaps between side surface portions in a width direction side of the glass ribbon of the opening of the molding chamber and respective ends in the width direction of the glass ribbon passing through the opening of the molding chamber are set in the range of 10 mm to 500 mm, wherein the opening of the molding chamber is formed of a first opening member and the first opening member includes plural blocks for molding chamber divided in a width direction of the glass ribbon passing through the opening of the molding chamber, and a shape dimension of the opening of the molding chamber is adjusted or changed by moving the one or plural blocks for molding chamber in a direction of moving near to or away from the vertical plane or by replacing the one or plural blocks for molding chamber.

2. The method for manufacturing a glass sheet according to claim 1, wherein the shape dimension of the opening of the molding chamber is adjusted or changed so that a gap between the vertical plane and at least a part of a side surface of the opening of the molding chamber, in a direction orthogonal to the vertical plane, changes in a width direction of the glass ribbon.

3. The method for manufacturing a glass sheet according to claim 1, wherein the shape dimension of the opening of the molding chamber is adjusted or changed based on a shape dimension of a manufactured glass sheet, temperature distribution of the inside of the molding chamber or temperature distribution of the inside of the opening of the molding chamber.

4. The method for manufacturing a glass sheet according to claim 1, wherein the opening of the molding chamber is substantially closed by the plural blocks for molding chamber when the molten glass is not run down along the both side surfaces of the molded body.

5. A method for manufacturing a glass sheet, the method comprising:

running down molten glass along both side surfaces of a molded body arranged inside a molding chamber;

joining and integrating the molten glass just under a lower edge part of the molded body; and drawing downward an integrated sheet-shaped glass ribbon out of an opening of the molding chamber, wherein a viscosity ratio ($V_2/V_1$) of a viscosity ($V_1$) of a center in a width direction of the molten glass in an upper edge of the molded body to a viscosity ($V_2$) of a center in a width direction of the glass ribbon passing through the opening of the molding chamber is set in the range of 20 to 50000, a thickness of the center in the width direction of the glass ribbon passing through the opening of the molding chamber is set to 1.0 mm or less, a gap between a vertical plane including a lower edge of the molded body and the opening of the molding chamber, in a direction orthogonal to the vertical plane, is set in the range of 8 mm to 70 mm, and gaps between side surface portions in a width direction side of the glass ribbon of the opening of the molding chamber and respective ends in the width direction of the glass ribbon passing through the opening of the molding chamber are set in the range of 10 mm to 500 mm, wherein the molding chamber is communicated with a communication chamber through the opening of the molding chamber, a second opening member for forming a communication chamber opening for drawing downward the glass ribbon out of the communication chamber includes plural blocks for communication chamber divided in a width direction of the glass ribbon passing through the communication chamber opening, and a shape dimension of the communication chamber opening is adjusted or changed by moving the one or plural blocks for communication chamber in a direction of moving near to or away from the vertical plane or by replacing the one or plural blocks for communication chamber.

* * * * *